US008632107B2

(12) United States Patent
Hirose

(10) Patent No.: US 8,632,107 B2
(45) Date of Patent: Jan. 21, 2014

(54) REAR STRUCTURE OF VEHICLE

(71) Applicant: Honda Motor Co., Ltd, Tokyo (JP)

(72) Inventor: Yoshitaka Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/677,434

(22) Filed: Nov. 15, 2012

(65) Prior Publication Data

US 2013/0127187 A1 May 23, 2013

(30) Foreign Application Priority Data

Nov. 21, 2011 (JP) .................. 2011-253898

(51) Int. Cl.
*B60R 19/02* (2006.01)

(52) U.S. Cl.
USPC ........................................ 293/102

(58) Field of Classification Search
USPC ................................ 293/102, 117
See application file for complete search history.

(56) References Cited

U.S. PATENT DOCUMENTS

| 2,050,435 | A | * | 8/1936 | Howard | 359/543 |
| 6,909,376 | B2 | * | 6/2005 | Rennick | 340/693.6 |
| 2008/0088141 | A1 | * | 4/2008 | Adachi et al. | 293/1 |
| 2010/0096865 | A1 | * | 4/2010 | Mckee et al. | 293/113 |
| 2010/0176608 | A1 | * | 7/2010 | Schelberg et al. | 293/117 |
| 2013/0127187 | A1 | * | 5/2013 | Hirose | 293/102 |

FOREIGN PATENT DOCUMENTS

| JP | 10-194038 A | 7/1998 |
| JP | 2008-290605 A | 12/2008 |

* cited by examiner

*Primary Examiner* — Lori Lyjak
(74) *Attorney, Agent, or Firm* — Westerman, Hattori, Daniels & Adrian, LLP

(57) ABSTRACT

A vehicle includes a rear bumper that extends in a vehicle width direction at a rear section of a vehicle body and that has a recess bulging toward a front side of the vehicle body, and a reflector attached to the recess. The recess has an opening for fixing the reflector to the rear bumper. The reflector has an attachment portion attached to the opening and a guide wall portion extending in the vertical direction. The recess has a first return hole at a position corresponding to an area below the vertical wall portion.

11 Claims, 9 Drawing Sheets

REAR STRUCTURE OF VEHICLE

CROSS REFERENCES TO RELATED APPLICATIONS

The present application claims priority under 35 U.S.C. §119 to Japanese Patent Application No. 2011-253898, filed Nov. 21, 2011, entitled "Rear Structure of Vehicle." The contents of this application are incorporated herein by reference in their entirety.

TECHNICAL FIELD

The present application relates to a rear structure of a vehicle having a reflector on a rear bumper.

BACKGROUND

A vehicles having a rear bumper attached to a rear section thereof and also having a reflector attached to the rear bumper is known (see, for example, Japanese Unexamined Patent Application Publication Nos. 10-194038 (FIG. 1) and 2008-290605 (FIG. 1)).

A vehicle discussed in Japanese Unexamined Patent Application Publication No. 10-194038 has a lamp attachment hole in the rear bumper, and a lamp unit is inserted in this attachment hole. The lamp unit has a lamp lens attached to a lamp housing. A lower section of the lamp housing is provided with a hood portion that extends toward the front side of the vehicle body relative to the lamp attachment hole.

The hood portion blocks muddy water splashed upward by a rear wheel. The blocked water travels along the hood portion and drips down from the front end of the hood portion so as to be drained therefrom. Since the water is drained toward the front side of the vehicle body, the water can be prevented from being drained to a design surface at the rear side of the vehicle body through a gap between the lower side of the lamp unit and the lamp attachment hole.

The water splashed upward by the rear wheel may sometimes spatter onto areas above the hood portion. The water spattered on the areas above the hood portion may reach the lamp unit from above the lamp unit. The water reaching the lamp unit may sometimes enter the interior of the lamp unit. With the vehicle discussed in Japanese Unexamined Patent Application Publication No. 10-194038, it is difficult to drain the water once it enters the lamp unit.

In a vehicle discussed in Japanese Unexamined Patent Application Publication No. 2008-290605, a recess that is recessed toward the front side of the vehicle body is formed in the rear bumper, and a reflector is fitted to this recess. An area of the rear bumper where the reflector is attached is covered with a shield member from the inside of the vehicle body.

By covering the aforementioned area with the shield member, muddy water splashed upward by a rear wheel can be prevented from entering the interior of the reflector from the area where the reflector is attached. By preventing the muddy water from entering the interior of the reflector, the muddy water is prevented from being drained toward a design surface of the rear bumper from the reflector. Because the muddy water is not drained to the design surface of the rear bumper, excellent external appearance can be maintained.

However, the configuration according to Japanese Unexamined Patent Application Publication No. 2008-290605 has a large number of components due to the use of the shield member. For this reason, there is room for improvement in the achievement of cost reduction of the vehicle.

SUMMARY

The present application describes a vehicle that can maintain excellent external appearance with a small number of components.

According to an aspect of the embodiment, a rear structure of a vehicle includes a rear bumper that extends in a vehicle width direction at a rear section of a vehicle body and that has a recess bulging toward a front side of the vehicle body, and a reflector that is attached to the recess. The recess has an opening for fixing the reflector to the rear bumper. The reflector has an attachment portion attached to the opening and a guide wall portion extending in an up-and-down direction. The guide wall portion may include an inclined portion or a bent portion. The guide wall portion may also be a vertical wall portion extending in a vertical direction. The recess has a first return hole at a position below the guide wall portion. The first return hole may be positioned corresponding to an area below the guide wall portion. Moreover, the first return hole may be positioned just below a lower end of the guide wall portion.

Water, such as muddy water, entering through the opening in the recess travels along the vertical wall portion so as to be guided to the return hole. The water is returned to the back surface of the rear bumper through the return hole. Thus, the water is prevented from flowing toward the outer side of the rear bumper via the reflector. By preventing the water from flowing toward the outer side, the external appearance of the rear bumper can be enhanced.

In addition, the vertical wall portion can be formed integrally with the reflector, and the return hole is formed in the recess. In other words, it is not necessary to use a new component for enhancing the external appearance of the rear bumper.

Accordingly, the present application can provide a vehicle that can maintain excellent external appearance with a small number of components.

Furthermore, the recess may have a contact section that is in contact with the reflector, and a ridge portion that extends in the vehicle width direction at an outer side of the contact section and is inclined toward one side in the vehicle width direction. Moreover, another return hole may be formed at an end of the ridge portion.

Water entering the interior of the reflector exudes to the ridge portion via the contact section. The water exuding to the ridge portion flows downward due to the inclination of the ridge portion. A portion of the water flowing downward flows toward the back surface of the rear bumper through the return hole. On the other hand, the remaining portion of the water not flowing to the return hole flows further downward due to the inclination of the ridge portion. The remaining portion of the water flows toward the back surface of the rear bumper through the another return hole formed at the end of the ridge portion. With the additional return hole, water is more reliably prevented from flowing toward the outer side of the rear bumper.

Furthermore, the rear bumper may have a partition on a back surface thereof, the partition being provided at an outer side of the opening in the vehicle width direction.

It is conceived that water splashed upward by a rear wheel would flow from the outer side toward the inner side in the vehicle width direction along the back surface of the recess due to an airflow along the back surface of the rear bumper. With the partition provided at the outer side of the opening in the vehicle width direction, the entry of water into the opening from the outer side in the vehicle width direction is suppressed. By suppressing the entry of water into the opening, the water is further prevented from flowing toward the outer side of the rear bumper.

Furthermore, the opening may be covered with a cover such that the cover surrounds an area of the opening where the attachment portion is attached.

By covering the opening with the cover, the entry of water into the opening is suppressed. By suppressing the entry of water into the opening, water is further prevented from flowing toward the outer side of the rear bumper.

Furthermore, the vehicle body may include a muffler that extends in a front-rear direction of the vehicle body and that is biased toward one side in the vehicle width direction. In this case, the recess may be positioned near a side of the muffler.

The muffler is a component through which high-temperature exhaust gas flows. With the muffler disposed near the recess, the recess is susceptible to heat from the muffler. In order to prevent water from flowing toward the general surface of the rear bumper, it is conceivable to cover the back surface of the rear bumper with a shield member in addition to the structure according to the present application.

However, depending on the material used for the shield member, the heat from the muffler may cause the shield member to deteriorate. In the case of such deterioration, it becomes difficult to use the shield member near the muffler.

According to the present application, water is drained through the return hole in the recess. Since the water is drained through the return hole in the recess, it is not necessary to use additional components. In other words, the water can be prevented from flowing toward the general surface of the rear bumper even in areas where the shield member cannot be installed.

BRIEF DESCRIPTION OF THE DRAWINGS

The advantages of the disclosure will become apparent in the following description taken in conjunction with the following drawings.

DETAILED DESCRIPTION

An embodiment of the present application will be described below with reference to the appended drawings.

In the following embodiment, the terms "left" and "right" will be respectively referred to as the left side and the right side with reference to a vehicle occupant seated in a vehicle, and the terms "front" and "rear" will be respectively referred to as the front side and the rear side with reference to the traveling direction of the vehicle.

Embodiment

A rear structure of a vehicle according to the embodiment will now be described with reference to FIG. 1.

Figure 1:
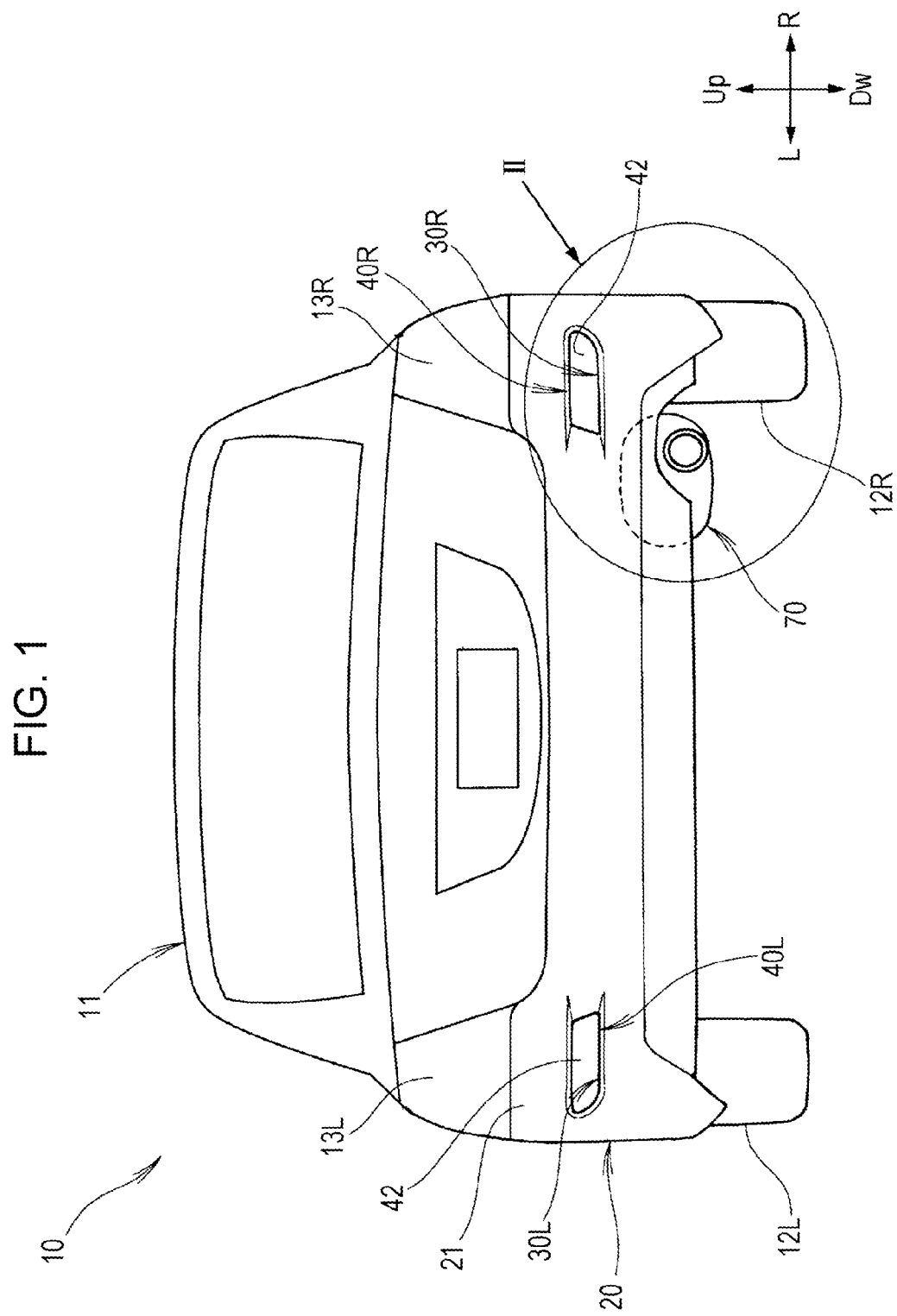
FIG. 1 is a rear view of a vehicle according to an embodiment.

As shown in FIG. 1, a vehicle 10 has right and left rear wheels 12R and 12L that are rotatably supported by the right and left sides of a vehicle body 11 (reference characters R and L denote the right side and the left side, respectively, as viewed from a driver, and the same applies hereinafter). A rear bumper 20 extends in the width direction above these rear wheels 12R and 12L. Rear lamps 13R and 13L are attached above the rear bumper 20. A muffler 70 for exhausting exhaust gas generated in an internal combustion engine to the outside is attached below the rear bumper 20. The muffler 70 extends in the front-rear direction (i.e., from the far side toward the near side of the drawing) along the bottom of the vehicle body 11.

The rear bumper 20 has a general surface 21 and recesses 30R and 30L that are recessed toward the front side of the vehicle body 11 from the general surface 21. The recesses 30R and 30L are respectively formed at opposite ends of the rear bumper 20 and substantially have a rectangular shape, as viewed from the rear side of the vehicle body 11. Reflectors 40R and 40L having the same shape as the recesses 30R and 30L are respectively fitted to the recesses 30R and 30L. The reflectors 40R and 40L are plastic reflective plates that reflect light emitted from the lights of a following vehicle. The reflector 40R is attached near the muffler 70.

The rear structure of the vehicle 10 according to the present application is at least applied to the reflector 40R disposed near the muffler 70. The configuration of the reflector 40R may also be applied to the reflector 40L attached to an area located away from the muffler 70. The reason why it is desirable to apply the structure according to the present application particularly to the reflector 40R disposed near the muffler 70 will be described later. The following description with reference to the subsequent drawings will be directed to the reflector 40R at the right side of the vehicle body 11 as an example.

Figure 2:
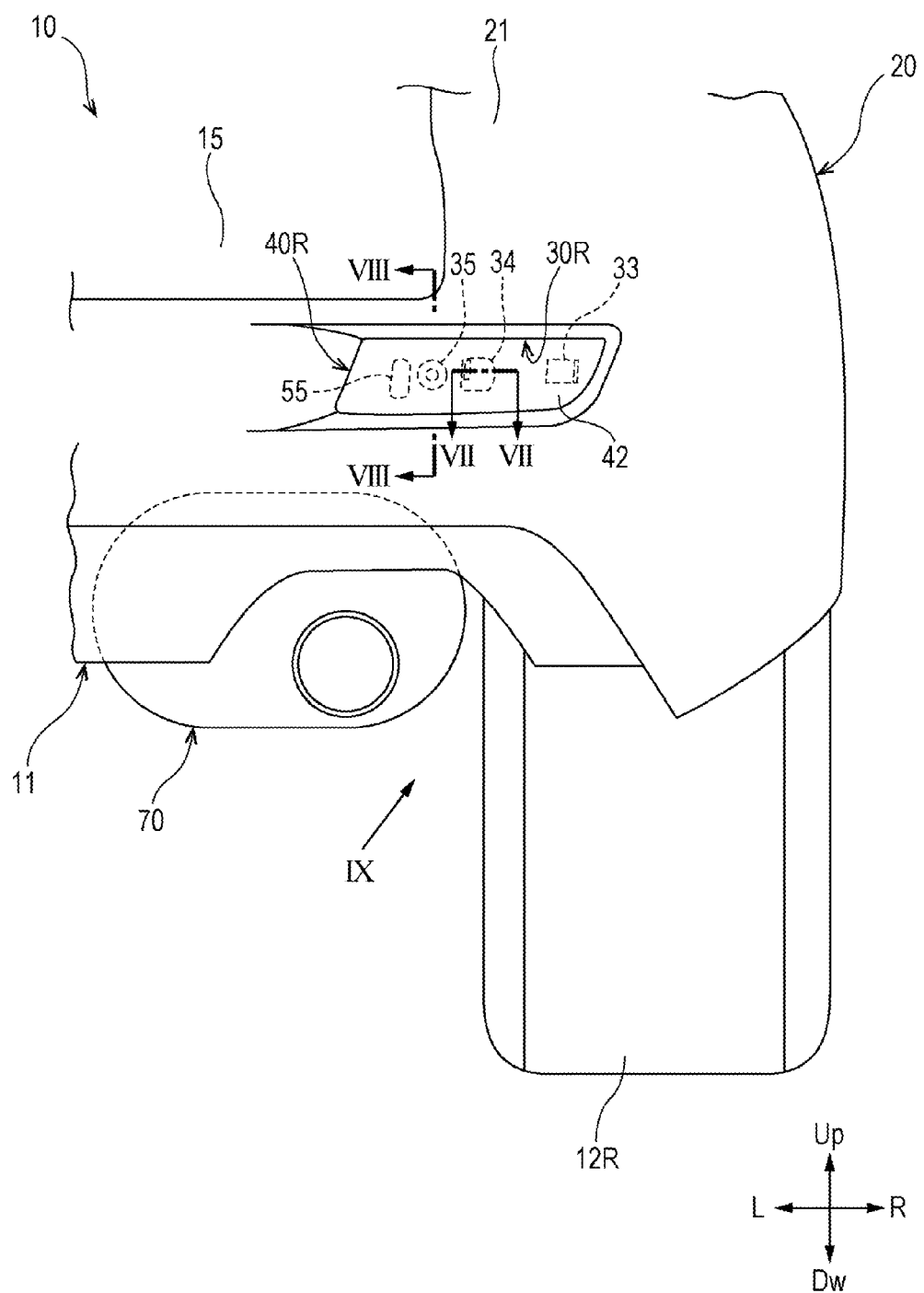
FIG. 2 is an enlarged view of area II in FIG. 1.
Figure 3:
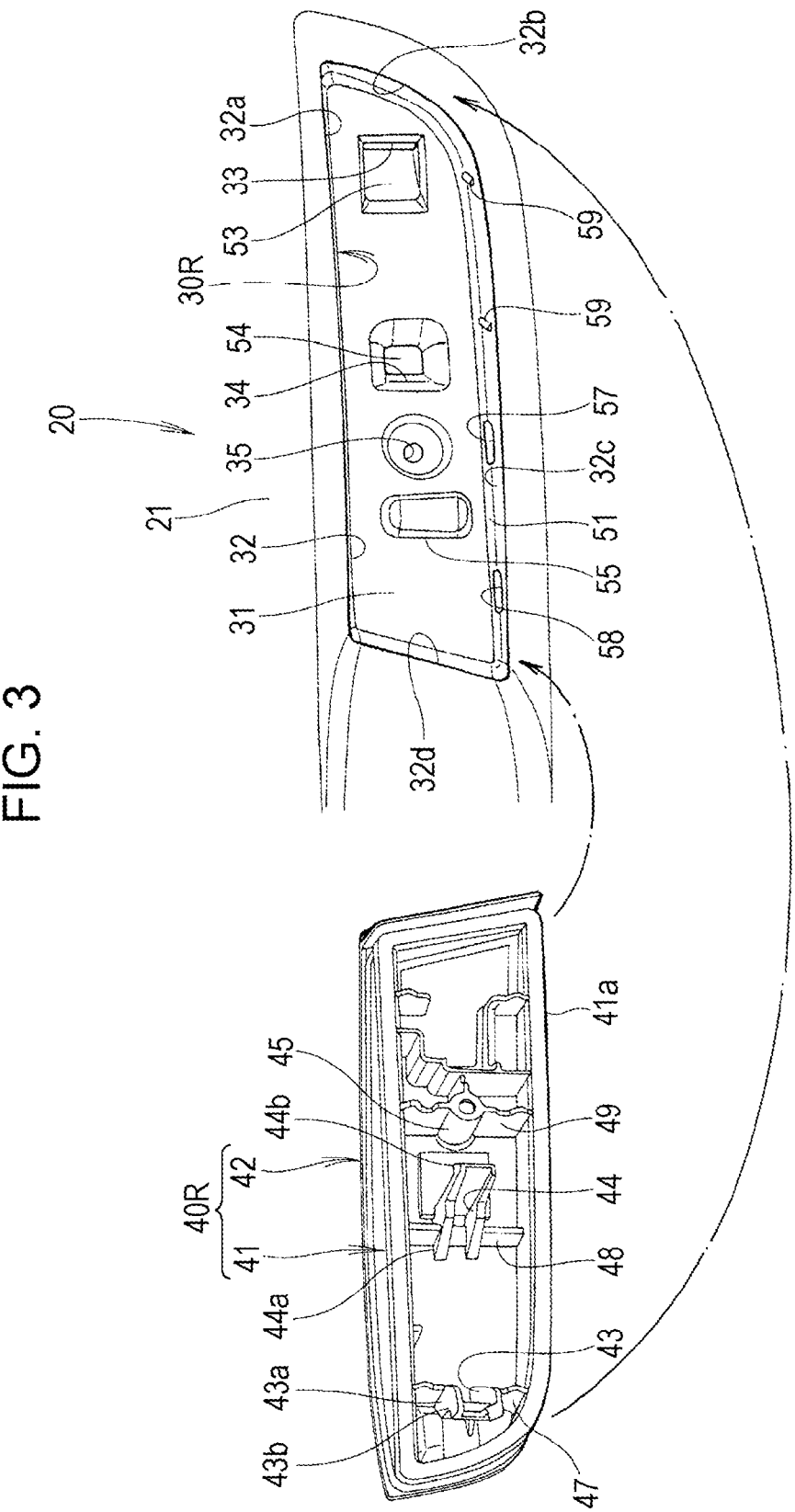
FIG. 3 illustrates a state where a reflector shown in FIG. 2 is detached from a rear bumper.

As shown in FIG. 2 and FIG. 3, the reflector 40R partially overlaps the muffler 70 in the vehicle width direction as viewed from the top of the vehicle. The back surface of the reflector 40R is provided with two hook-like attachment portions 43 and 44 and a screw attachment hole 45 into which a tapping screw (see reference numeral 65 in FIG. 8) is screwed. The reflector 40R is attached to the rear bumper 20 via the attachment portions 43 and 44 and the screw hole 45.

The reflector 40R is attachable to and detachable from the recess 30R. The recess 30R has a base section 31 that extends substantially parallel to the general surface 21 of the rear bumper 20, and an erected section 32 that is erected from the base section 31 so as to be connected to the general surface 21.

The base section 31 has two openings 33 and 34 for attaching the reflector 40R thereto. Moreover, the base section 31 has a screw insertion hole 35 through which the tapping screw (see reference numeral 65 in FIG. 8) is inserted.

The reflector 40R has a main body section 41 and a reflective section 42 that covers the main body section 41 and reflects light. The main body section 41 has the attachment portions 43 and 44, which are to be attached to the openings 33 and 34, in areas corresponding to the openings 33 and 34 in the recess 30R. Moreover, the screw attachment hole 45 to which the tapping screw is to be screwed is formed in an area corresponding to the screw insertion hole 35.

Vertical wall portions 47, 48, and 49 respectively extend from the attachment portions 43 and 44 and the screw attachment hole 45 toward an edge 41a of the main body section 41. The vertical wall portions 47, 48, and 49 are provided for increasing the strength of the attachment portions 43 and 44 and the screw attachment hole 45, as well as for guiding the flow of water entering the interior of the reflector 40R.

The recess 30R and the reflector 40R will now be described in more detail with reference to subsequent drawings.

Figure 4:
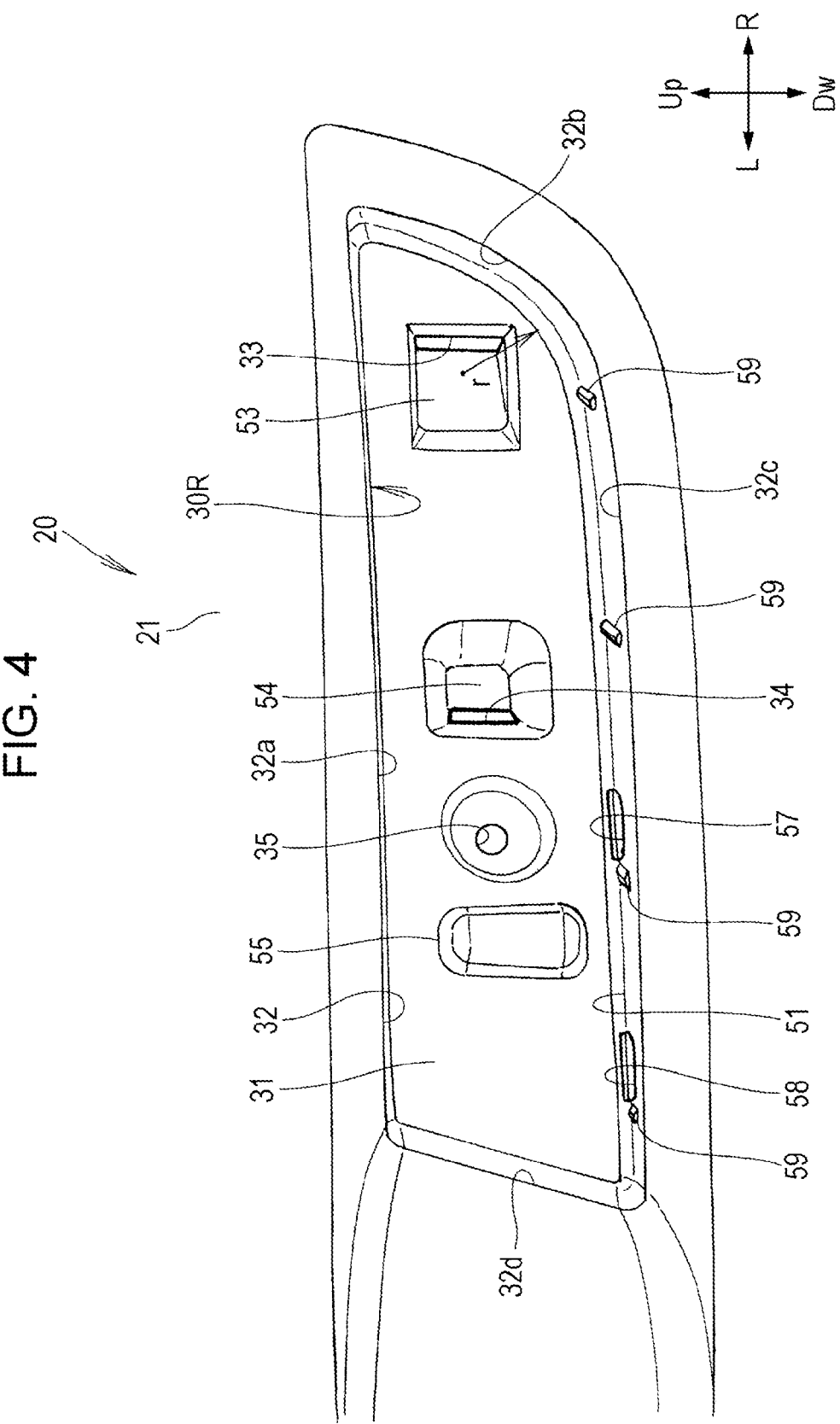
FIG. 4 is a front view of a recess shown in FIG. 3.

As shown in FIG. 4, the erected section 32 gradually connects to the base section 31 such that an area where the erected section 32 and the base section 31 are connected to each other substantially has a circular arc shape. This substantially circular-arc shaped area is a ridge portion 51. The ridge portion 51 is formed along the entire perimeter of the base section 31.

The erected section 32 has a first horizontal side 32a extending substantially horizontally in the vehicle width direction, a first vertical side 32b extending downward diagonally from one end of the first horizontal side 32a, a second horizontal side 32c extending with a slight downward gradient from a lower end of the first vertical side 32b, and a second vertical side 32d extending upward from a lower end of the second horizontal side 32c so as to connect to the first horizontal side 32a.

The first vertical side 32b is obtusely connected to the second horizontal side 32c. In addition, this connected area forms a circular arc shape having a radius r. Thus, water entering the interior of the reflector 40R can be prevented from accumulating in this connected area between the first vertical side 32b and the second horizontal side 32c.

The openings 33 and 34 substantially have a rectangular shape and are covered with covers 53 and 54, respectively. The covers 53 and 54 are both recessed further toward the front side of the vehicle body 11 from the base section 31 of the recess 30R. By giving the covers 53 and 54 a recessed shape, the rigidity of the base section 31 is increased, so that the reflector 40R can be firmly supported.

The screw insertion hole 35 is formed in an area that is recessed further toward the front side of the vehicle body 11 from the recess 30R. Thus, the rigidity near the screw insertion hole 35 is increased, so that the reflector 40R can be firmly supported. A bead portion 55 for reinforcing the base section 31 is formed in a freely-chosen area of the base section 31.

The ridge portion 51 is provided with a first return hole 57 located below the screw insertion hole 35 and provided for draining water, and a second return hole 58 formed at the lower end of the second horizontal side 32c.

In other words, referring to FIG. 3, the first return hole 57 is formed at a position corresponding to an area below the vertical wall portion 49 connected to the screw attachment hole 45. Furthermore, the second return hole 58 is located at the lower end of the ridge portion 51. The expression area below the vertical wall portion 49" refers to an area where at least a portion of the first return hole 57 overlaps the vertical wall portion 49 in the vehicle width direction as viewed from the top of the vehicle.

The first return hole 57 can be formed at a freely-chosen position corresponding to any one of the vertical wall portions 47 to 49. Furthermore, multiple first return holes 57 may be provided. In other words, in the case where multiple vertical wall portions 47 to 49 are provided, one or more first return holes 57 may be formed at a position or positions corresponding to an area or areas below any one or more of the vertical wall portions 47 to 49.

The second horizontal side 32c has a plurality of protrusions 59. The protrusions 59 serve as adjustment ribs used for positioning the reflector 40R.

The recess 30R will now be described in more detail with reference to subsequent drawings.

Figure 5:
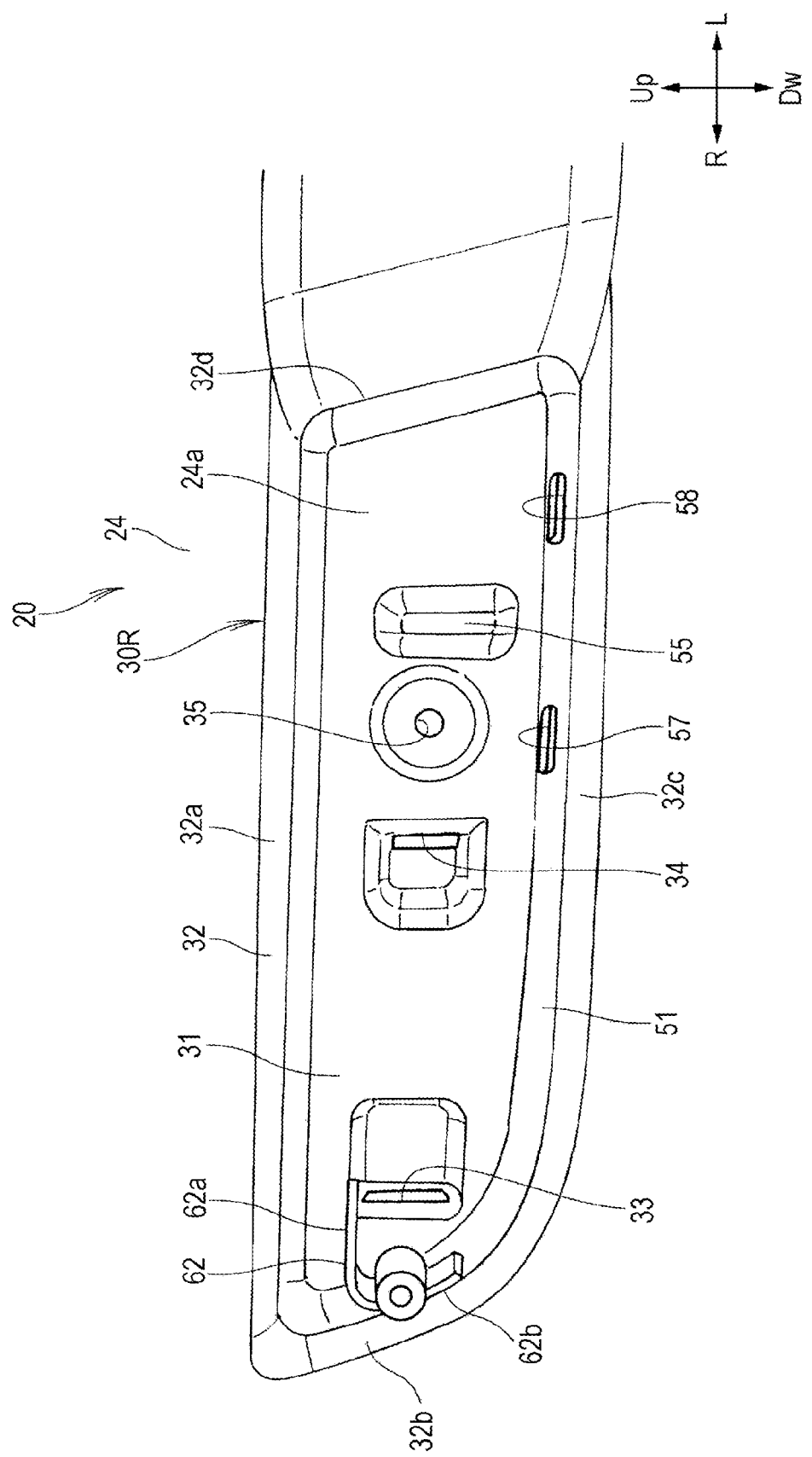
FIG. 5 is a back view of the recess shown in FIG. 4.

As shown in FIG. 5, a substantially L-shaped partition 62 is formed on a back surface 24a of the recess 30R (i.e., a back surface 24 of the rear bumper 20). The partition 62 is provided at the outer side of the opening 33 in the vehicle width direction, and has an extension segment 62a extending outward in the vehicle width direction from the cover 53, and an opposing segment 62b extending downward from an end of the extension segment 62a and facing the cover 53. The partition 62 is formed of the extension segment 62a and the opposing segment 62b that extend in different directions. Thus, the amount of water entering the opening 33 can be reduced, as compared with a case where a partition only having the extension segment 62a or the opposing segment 62b is used.

In addition, the height of the partition 62 is set to be greater than the height to which the cover 53 is recessed toward the front side of the vehicle body 11 from the recess 30R. With the sufficiently greater height than the cover 53, water is prevented from entering the opening 33.

The reflector 40R will now be described in detail with reference to subsequent drawings.

Figure 6:
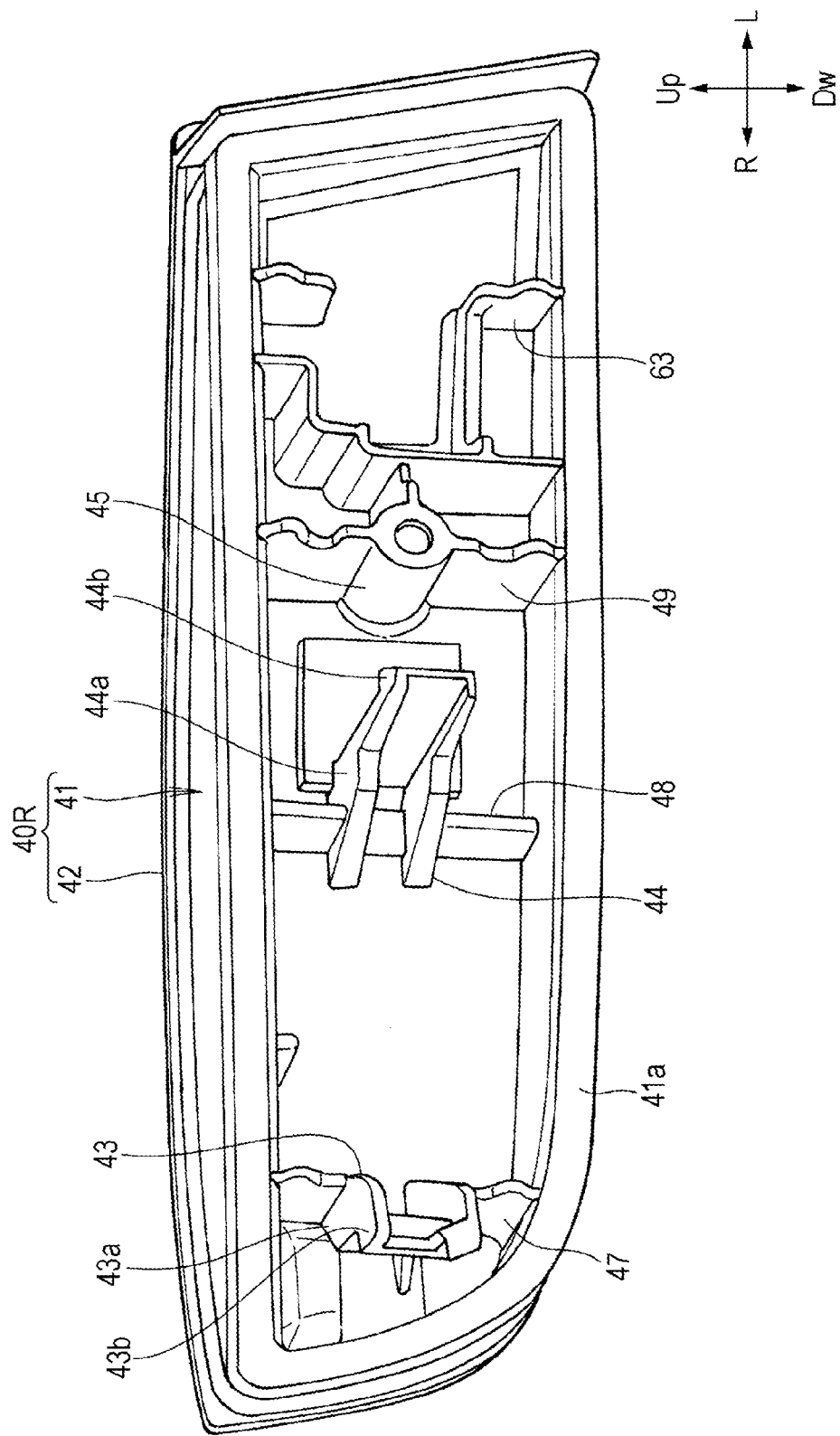
FIG. 6 is a back view of the reflector shown in FIG. 3.

As shown in FIG. 6, the attachment section 43 at the outer side in the vehicle width direction includes a base portion 43a erected from the main body section 41, and a hook portion 43b that is formed at an end of the base portion 43a and is to be locked to the corresponding opening (see reference numeral 33 in FIG. 3). The hook portion 43b is oriented toward the outer side in the vehicle width direction.

The attachment section 44 at the inner side in the vehicle width direction includes a base portion 44a erected from the main body section 41, and a hook portion 44b that is formed at an end of the base portion 44a and is to be locked to the corresponding opening (see reference numeral 34 in FIG. 3). The hook portion 44b is oriented toward the inner side in the vehicle width direction.

Another vertical wall portion 63 is formed beside the screw attachment hole 45. The vertical wall portion 63 does not have an area to be attached to the recess (see reference numeral 30R in FIG. 3). A lower end of the vertical wall portion 63 overlaps the second return hole 58 in the vehicle width direction.

When the reflector 40R is to be attached to the recess 30R, the reflector 40R is pressed into the recess 30R from the rear side of the vehicle body 11.

Figure 7:
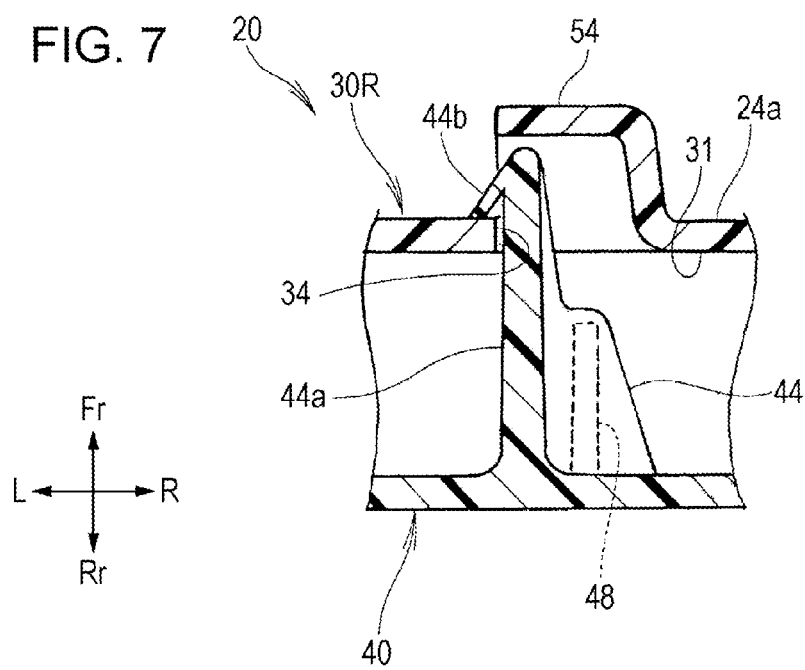
FIG. 7 is a cross-sectional view taken along line VII-VII in FIG. 2.

As shown in FIG. 7, by pressing the reflector 40R into the recess 30R, the hook portion 44b becomes locked to the opening 34, whereby the reflector 40R is temporarily secured to the recess 30R. Furthermore, the cover 54 covers the opening 34 so as to surround the area (near the hook portion 44b) thereof where the attachment section 44 is attached.

By covering the openings 33 and 34 with the covers 53 and 54, the entry of water into the openings 33 and 34 is suppressed. By suppressing the entry of water into the openings 33 and 34, water is prevented from flowing toward the outer side (i.e., the general surface 21 side) of the rear bumper 20.

The hook portion 43b is also locked to the opening 33 in a similar manner to that shown in FIG. 7. Furthermore, the cover 53 covers the opening 33 so as to surround the area (near the hook portion 43b) thereof where the attachment section 43 is attached.

Referring to FIG. 6, in the case where multiple attachment portions 43 and 44 are provided, the hook portions 43b and 44b are preferably oriented away from each other in the vehicle width direction or the vertical direction. With the hook portions 43b and 44b oriented away from each other, looseness between the reflector 40R and the recess 30R can be suppressed when the reflector 40R is temporarily secured to the recess 30R. By suppressing such looseness, the screw attachment hole 45 can be readily aligned with the screw insertion hole 35, thereby facilitating the attachment process of the reflector 40R.

Figure 8:
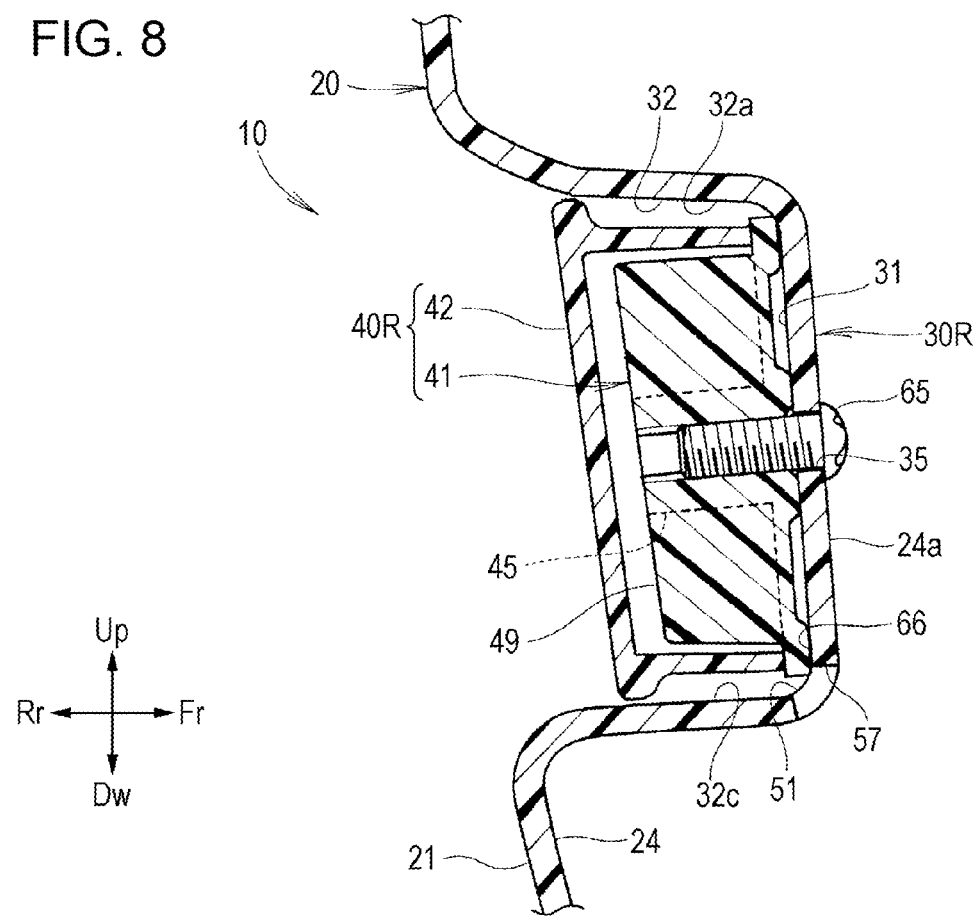
FIG. 8 is a cross-sectional view taken along line VIII-VIII in FIG. 2.

As shown in FIG. 8, the temporarily secured reflector 40R is fixed to the recess 30R by screwing a tapping screw 65 into the screw attachment hole 45 from the front side of the vehicle body 11. An area where the reflector 40R is in contact with the recess 30R is referred to as a contact section 66. The contact section 66 partially occupies the base section 31.

The operation of the vehicle 10 will be described below with reference to subsequent drawings.

Figure 9:
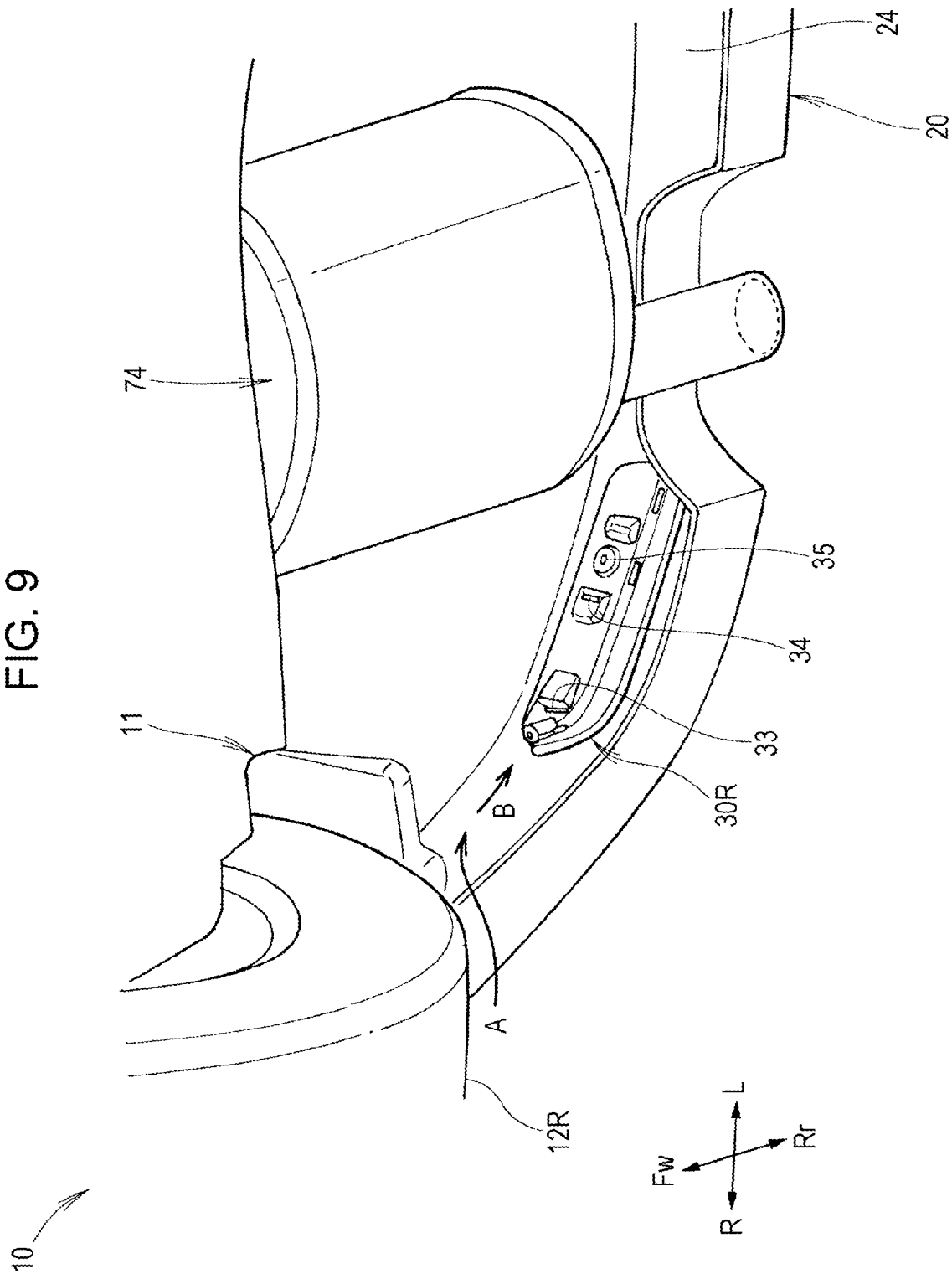
FIG. 9 is a diagram of an area indicated by arrow XI in FIG. 2.

As shown in FIG. 9, for example, the rear wheel 12R splashes water, such as muddy water, when the vehicle 10 is running (see arrow A). As indicated by arrow B, it is conceivable that the splashed water would flow from the outer side toward the inner side of the vehicle body 11 along the back surface 24 of the rear bumper 20 due to an airflow near the back surface 24 of the rear bumper 20. The water flowing from the outer side toward the inner side of the vehicle body 11 enters the interior of the reflector (see reference numeral 40R in FIG. 3) via the openings 33 and 34 and the screw insertion hole 35.

The flow of the water entering the interior of the reflector 40R will be described below with reference to subsequent drawings.

Figure 10:
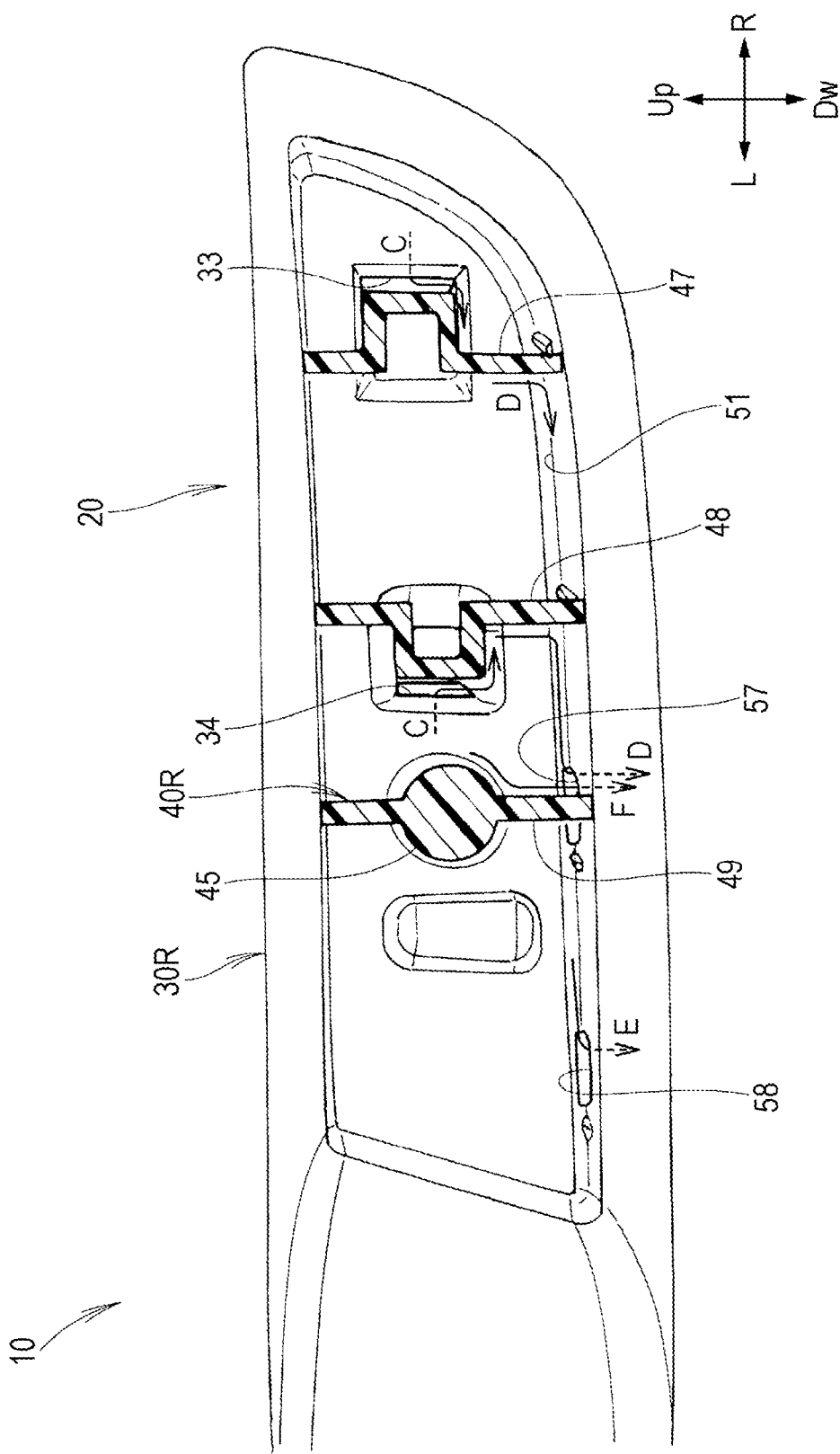
FIG. 10 is a diagram for explaining the flow of water entering the interior of the reflector.

As shown in FIG. 10, the water entering through the openings 33 and 34 (see arrow C) flows downward along the vertical wall portions 47 and 48. As indicated by arrow D, the water reaching the lower ends of the vertical wall portions 47 and 48 flows to the ridge portion 51. Because the ridge portion 51 is formed with a slight downward gradient toward the inner side in the vehicle width direction, the water flows toward the first return hole 57. Most of the water flowing toward the first return hole 57 is returned to the back surface (see reference numeral 24 in FIG. 9) of the rear bumper 20 through the first return hole 57. The water flowing around the first return hole 57 and not returning to the back surface of the rear bumper 20 through the first return hole 57 further flows to the lower end of the ridge portion 51, as indicated by arrow E. The water flowing to the lower end of the ridge portion 51 is returned to the back surface of the rear bumper 20 through the second return hole 58.

Sometimes, water exudes from the screw insertion hole (see reference numeral 35 in FIG. 8) toward the reflector 40R via the tapping screw (see reference numeral 65 in FIG. 8). Such water basically flows in a similar manner to the water entering through the openings 33 and 34. Specifically, as indicated by arrow F, most of the water travels along the vertical wall portion 49 from the screw attachment hole 45 so as to flow into the first return hole 57. The water not returning to the back surface of the rear bumper 20 through the first return hole 57 flows to the lower end of the ridge portion 51, as indicated by arrow E, so as to flow to the back surface of the rear bumper 20 through the second return hole 58.

The following can be said with reference to FIG. 9 and FIG. 10.

The reflector 40R has the vertical wall portion 49 extending in the vertical direction, and the recess 30R has the first return hole 57 at a position corresponding to the area below the vertical wall portion 49. Water, such as muddy water, entering through the openings 33 and 34 in the recess 30R travels along the vertical wall portion 49 so as to be guided to the first return hole 57. The water is returned to the back surface 24 of the rear bumper 20 through the first return hole 57. Thus, the water is prevented from flowing toward the outer side (i.e., the general surface 21 side in FIG. 1) of the rear bumper 20 via the reflector 40R. By preventing the water from flowing toward the outer side, the external appearance of the rear bumper 20 can be enhanced.

In addition, the vertical wall portion 49 can be formed integrally with the reflector 40R, and the first return hole 57 is formed in the recess 30R. In other words, it is not necessary to use a new component for enhancing the external appearance of the rear bumper 20.

Accordingly, the present application can provide a vehicle 10 that can maintain excellent external appearance with a small number of components.

Furthermore, the back surface 24 of the rear bumper 20 has the partition 62 (see also FIG. 5) provided at the outer side of the opening 33 in the vehicle width direction. It is conceivable that water splashed upward by the rear wheel 12R would flow from the outer side toward the inner side in the vehicle width direction along the back surface 24a of the recess 30R due to an airflow along the back surface 24 of the rear bumper 20. With the partition 62 provided at the outer side of the opening 33 in the vehicle width direction, the entry of water into the opening 33 from the outer side in the vehicle width direction is suppressed. By suppressing the entry of water into the opening 33, the water is further prevented from flowing toward the outer side of the rear bumper 20.

In addition, the vehicle body 11 includes the muffler 70 that extends in the front-rear direction of the vehicle body 11 and is biased toward one side in the vehicle width direction. The recess 30R is positioned near a side of the muffler 70. The muffler 70 is a component through which high-temperature exhaust gas flows. With the muffler 70 disposed near the recess 30R, the recess 30R is susceptible to heat from the muffler 70. In order to prevent water from flowing toward the general surface (see reference numeral 21 in FIG. 1) of the rear bumper 20, it is conceivable to cover the back surface 24 of the rear bumper 20 with a shield member in addition to the structure according to the present application.

However, depending on the material used for the shield member, the heat from the muffler 70 may cause the shield member to deteriorate. In the case of such deterioration, it becomes difficult to use the shield member near the muffler 70.

According to the present application, water is drained through the first and second return holes 57 and 58 in the recess 30R. Since the water is drained through the return holes 57 and 58 in the recess 30R, it is not necessary to use additional components. In other words, the water can be prevented from flowing toward the general surface of the rear bumper 20 even in areas where the shield member cannot be installed.

Referring to FIG. 8, the recess 30R has the contact section 66 that is in contact with the reflector 40R, and the ridge portion 51 inclined toward one side in the vehicle width direction. As specifically shown in FIG. 10, the second return hole 58 is formed at the lower end of the ridge portion 51. Water entering the interior of the reflector 40R exudes to the ridge portion 51 via the contact section 66. The water exuding to the ridge portion 51 flows downward due to the inclination of the ridge portion 51. A portion of the water flowing downward flows toward the back surface 24 of the rear bumper 20 through the first return hole 57. On the other hand, the remaining portion of the water not flowing to the first return hole 57 flows further downward due to the inclination of the ridge portion 51. The remaining portion of the water flows toward the back surface 24 of the rear bumper 20 through the second return hole 58 formed at the lower end of the ridge portion 51. With the second return hole 58, water is more reliably prevented from flowing toward the outer side of the rear bumper 20.

The rear structure of a vehicle according to the present application can also be applied to a vehicle having a muffler disposed at the left side of the vehicle body, a vehicle having mufflers disposed at the left and right sides of the vehicle body, or a vehicle having a muffler disposed in the center. In other words, the rear structure of a vehicle according to the present application can be applied to any type of vehicle regardless of the installation position of the muffler or mufflers.

The rear structure of a vehicle according to the present application is advantageous when driving the vehicle in the rain.

What is claimed is:

1. A rear structure of a vehicle, comprising:
    a rear bumper extending in a vehicle width direction provided at a rear section of a vehicle body and including a recess recessing toward a front side of the vehicle body; and
    a reflector attached to the recess,
    wherein the recess includes an opening for fixing the reflector to the rear bumper,
    wherein the reflector includes an attachment portion attached to the opening and a guide wall portion extending in an up-and-down direction, and
    wherein the recess includes a first return hole at a position below the guide wall portion.

2. The rear structure of the vehicle according to claim 1, wherein the recess includes a contact section in contact with the reflector, and a ridge portion extending in the vehicle width direction on an outer side of the contact section and being inclined to one side in the vehicle width direction, and
    wherein a second return hole is formed at an lower end of the ridge portion.

3. The rear structure of the vehicle according to claim 1, wherein the rear bumper includes a partition wall on a back surface thereof, the partition being provided on an outer side of the opening in the vehicle width direction.

4. The rear structure of the vehicle according to claim 1, wherein the opening is covered with a cover such that the cover covers an area of the opening where the attachment portion is attached.

5. The rear structure of the vehicle according to claim 1, wherein the vehicle body includes a muffler extending in a front-rear direction of the vehicle body and being positioned off-center in the vehicle width direction, and
    wherein the recess is positioned near a side of the muffler.

6. The rear structure of the vehicle according to claim 1, wherein the recess includes the first return hole at a position corresponding to an area below the guide wall portion.

7. The rear structure of the vehicle according to claim 1, wherein the guide wall portion is a vertical wall portion extending in a vertical direction.

8. The rear structure of the vehicle according to claim 7, wherein the first return hole is disposed at a position corresponding to an area below the vertical wall portion.

9. The rear structure of the vehicle according to claim 1, wherein the recess bulges toward the front side of the vehicle body from a back surface of the rear bumper.

10. The rear structure of the vehicle according to claim 1, wherein the guide wall is disposed in continuous with the attachment portion such that the attachment portion and the guide wall provide a guide for a water entering the opening.

11. The rear structure of the vehicle according to claim 1, wherein the guide wall is positioned below the opening.

* * * * *